United States Patent
Slawinski

(10) Patent No.: US 8,445,607 B2
(45) Date of Patent: May 21, 2013

(54) PROCESS FOR THE PREPARATION OF A PARTICULATE BIMODAL POLYETHYLENE PRODUCT

(75) Inventor: Martine Slawinski, Nivelles (BE)

(73) Assignee: Total Research & Technology Feluy, Seneffe (Feluy) (BE)

( * ) Notice: Subject to any disclaimer, the term of this patent is extended or adjusted under 35 U.S.C. 154(b) by 0 days.

(21) Appl. No.: 13/514,085

(22) PCT Filed: Dec. 17, 2010

(86) PCT No.: PCT/EP2010/070014
§ 371 (c)(1),
(2), (4) Date: Jun. 6, 2012

(87) PCT Pub. No.: WO2011/073364
PCT Pub. Date: Jun. 23, 2011

(65) Prior Publication Data
US 2012/0245307 A1    Sep. 27, 2012

(30) Foreign Application Priority Data
Dec. 18, 2009  (EP) .................................... 09179786

(51) Int. Cl.
*C08F 2/14*       (2006.01)
*C08F 4/643*      (2006.01)
*C08F 10/02*      (2006.01)

(52) U.S. Cl.
USPC .............. 526/64; 526/129; 526/908; 526/909

(58) Field of Classification Search
USPC .................................... 526/64, 908, 909, 129
See application file for complete search history.

(56) References Cited

U.S. PATENT DOCUMENTS

| | | | |
|---|---|---|---|
| 2002/0065368 A1* | 5/2002 | Debras et al. .................. | 525/191 |
| 2004/0014917 A1 | 1/2004 | Eberle et al. | |
| 2008/0221280 A1* | 9/2008 | Damme .......................... | 526/64 |
| 2008/0318015 A1 | 12/2008 | Stephenne et al. | |
| 2011/0015353 A1 | 1/2011 | Michel et al. | |

* cited by examiner

*Primary Examiner* — Fred M Teskin

(57) ABSTRACT

The invention relates to a process for the preparation of a particulate bimodal polyethylene product having a median particle diameter of less than 300 μm in a serially connected double loop reactor, wherein said polymerization catalyst applied in the polymerization process comprises a particulate metallocene-alumoxane catalyst immobilized on a porous silica support, wherein said polymerization catalyst has a median particle diameter of less than 50 μm; and whereby the ratio of the median particle diameter of the obtained bimodal polyethylene product to the median particle diameter of the applied polymerization catalyst is less than 30.

14 Claims, No Drawings

PROCESS FOR THE PREPARATION OF A PARTICULATE BIMODAL POLYETHYLENE PRODUCT

CROSS-REFERENCE TO RELATED APPLICATIONS

This application claims the benefit of PCT/EP2010/070014, filed Dec. 17, 2010, which claims priority from EP 09179786.0, filed Dec. 18, 2009.

TECHNICAL FIELD OF THE INVENTION

The present invention relates to a process for the preparation of a particulate bimodal polyethylene product, in particular polyethylene having a controlled particle size. According to the invention, polyethylene products with a bimodal molecular weight distribution are prepared in a polymerization loop system comprising a double loop reactor, wherein the polymerization is catalyzed by a supported metallocene-alumoxane catalyst.

BACKGROUND OF THE INVENTION

Polyethylene resins having bimodal characteristics include resins that comprise two components having different properties, such as for instance two components of different molecular weight, i.e. a component with a relatively higher molecular weight component (HMW) and a component with a lower molecular weight (LMW) component; two components of different densities; and/or two components having different productivities or reaction rates with respect to co-monomer.

The use of metallocene catalysts for polymerization and copolymerization of ethylene is a relatively recent development. Processes for producing bimodal polyolefins in general and bimodal polyethylene in particular in the presence of metallocene catalysts have been described.

Bimodal polyethylene resins can be prepared according to different methods. Bimodal polyethylene products can for instance be made by physically blending different monomodal polyethylene products, which are independently produced. However, a problem with those physically produced bimodal products is that they usually contain high levels of gels.

Bimodal polyethylene can also be produced by combining two different catalyst systems in a single reactor, as is described for instance in WO 2006/045738. Alternatively, a single dual site catalyst system can be used to produce bimodal polyethylene in a single reactor, as is described for instance in WO 2004/029101.

In addition to producing bimodal polyethylene in a single reactor, bimodal polyethylene can also be produced in serially connected reactors. For instance, WO 02/28922 describes a process for the production of bimodal polyethylene comprising producing a first polyethylene fraction in a first slurry loop reactor and producing a second polyethylene fraction in a second slurry loop reactor, serially connected to the first reactor, wherein the first polyethylene fraction is passed from the first reactor to the second reactor, and wherein the molecular weight of the polyethylene fractions in the first and second reactors is different. Depending on the desired product characteristics, catalysts features and/or reaction conditions can be adapted in such processes.

However, using metallocene-based catalyst systems to catalyze the preparation of bimodal polyolefins such as bimodal polyethylene, results in polymer fractions that may be difficult to mix with one another, in particular when bimodal polyolefins are produced in separate reactors. A problem associated with known bimodal polyethylene products is that if the individual polyethylene components are too different in molecular weight and density, they may not be homogeneously mixed with each other as desired. As a consequence harsh extrusion conditions or repeated extrusions are sometimes necessary which might lead to partial degradation of the final product and/or additional cost. Thus the optimum mechanical and processing properties are not achieved in the final polyethylene product. Also, bimodal polymer particles produced may not be sufficiently uniform in size, and hence segregation of polymer during storage and transfer can produce non-homogeneous products.

Another problem with known bimodal polyolefins is that defects sometimes are visible in the finished product where the catalyst used in the olefin polymerization is a metallocene catalyst. In particular, dots or specks and/or rough patches sometimes are visible on the surface of products, e.g. tubes or pipe, made from pellets of a bimodal product that were produced using a metallocene catalyst. Such defects can make the pipe weaker and can affect the free flow of liquid through the pipe. This type of defect may occur because of homogenization problems in the extruder.

Thus, many applications still require improved miscibility of the polyolefin components of a bimodal polyolefin product such that in turn the mechanical and processing properties of the polyolefins, and in particular polyethylene, can be further improved.

In view of the above, there remains a need in the art to provide an improved polymerization process for making bimodal polyolefin resin, and in particular polyethylene, which overcomes at least some of the above-mentioned problems.

SUMMARY OF THE INVENTION

The present invention provides a process for preparing bimodal polyethylene that is carried out in the presence of a supported metallocene-alumoxane catalyst system in two liquid full loop reactors connected in series wherein different molecular weight fractions are produced. The present invention relates in particular to a process for preparing bimodal polyethylene having improved polymer granulometry and morphology, and in particular having a median particle diameter of less than 300 µm. The present process is at least in part based on the use of a supported metallocene-alumoxane catalyst having a controlled particle size, and in particular a median particle diameter of less than 50 µm.

The process according to the invention permits to prepare bimodal polyethylene that is easier to homogenize during extrusion, and hence that provides less defects when further processed into a final product.

Thereto, the invention relates in a first aspect to a process for the preparation of a particulate bimodal polyethylene product in a serially connected double loop reactor, comprising the steps of:

(a) feeding ethylene monomer, a liquid hydrocarbon diluent, at least one polymerization catalyst, optionally hydrogen, and optionally one or more olefin co-monomers to a first loop reactor;

(b) polymerizing said ethylene and said optionally one or more olefin co-monomers in said first loop reactor to produce a first polyethylene product;

(c) transferring said first polyethylene product to a second loop reactor;

(d) feeding ethylene monomer, a diluent, optionally hydrogen, and optionally one or more olefin co-monomers to said second loop reactor;
(e) polymerizing said ethylene and said optionally one or more olefin co-monomers in said second loop reactor in the presence of said first polyethylene product to produce a bimodal polyethylene product;
(f) recovering from said second loop reactor said bimodal polyethylene product having a median particle diameter of less than 300 μm,
wherein said polymerization catalyst comprises a particulate metallocene-alumoxane catalyst immobilized on a porous silica support, and wherein said polymerization catalyst has a median particle diameter of less than 50 μm, and
whereby the ratio of the median particle diameter of said bimodal polyethylene product to the median particle diameter of said polymerization catalyst is less than 30.

In another embodiment, the invention relates to a process as described above, wherein said bimodal polyethylene product comprises at least two different polyethylene fractions, whereby one of said fractions has a higher molecular weight than said other fraction and wherein each of said polyethylene fractions has a polydispersity index of maximum 5, and wherein said bimodal polyethylene product has a polydispersity index which is greater than the largest polydispersity index of said polyethylene fractions.

In yet another embodiment, the invention also relates to a process as described above, wherein the polyethylene fraction having said higher molecular weight has a high load melt index (HLMI; ASTM-D1238, 190° C., 21.6 kg) comprised between 0.01 g/10 min and 10 g/10 min and wherein said bimodal polyethylene product has a HLMI higher than 3 g/10 min.

Accordingly, the invention relates to a process for producing a bimodal polyethylene product of which the polyethylene fractions have clearly distinguishable but overlapping molecular weight distributions, but wherein polyethylene fractions present within the bimodal polyethylene product can be optimally mixed and homogenized during further processing of the bimodal product, resulting in an end product having improved homogeneity. Homogeneity of polymer resins can be determined by optical techniques known to a skilled person, such as for instance by microscopic analyses.

The catalysts which are used in the process according to the invention are metallocene-based catalysts, which have controlled granulometry and properties. More in particular, said metallocene-based catalysts include particulate catalysts comprising a metallocene and an alumoxane which are provided on silica porous support. Moreover, the present invention provides a process wherein the polymerization catalyst has a median particle diameter of less than 50 μm.

In an embodiment, the invention relates to a process as described above wherein said metallocene has formula (I) or (II)

  (I) for non-bridged metallocenes; or

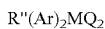  (II) for bridged metallocenes wherein each Ar is independently selected from the group consisting of cyclopentadienyl, indenyl, tetrahydroindenyl, and fluorenyl; and wherein Ar is optionally substituted with one or more substituents each independently selected from the group consisting of halogen, a hydrosilyl, a $SiR_3$ wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P;

wherein M is a transition metal selected from the group consisting of titanium, zirconium, hafnium and vanadium;
wherein each Q is independently selected from the group consisting of halogen; a hydrocarboxy having 1 to 20 carbon atoms; and a hydrocarbyl having 1 to 20 carbon atoms wherein said hydrocarbyl optionally contains one or more atoms selected from the group comprising B, Si, S, O, F, Cl and P;
wherein R" is a bridge between the two Ar and selected from the group consisting of a $C_1$-$C_{20}$ alkylene, a germanium, a silicon, a siloxane, an alkylphosphine and an amine, wherein said R" is optionally substituted with one or more substituents each independently selected from the group consisting of halogen, a hydrosilyl, a $SiR_3$ wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P.

In a further embodiment, the invention relates to a process as described above wherein said alumoxane has formula (III) or (IV)

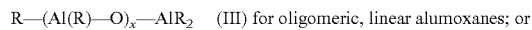

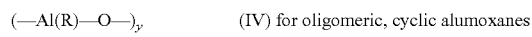

wherein x is 1-40, y is 3-40, and each R is independently selected from a $C_1$-$C_8$ alkyl.

In a preferred embodiment, the invention relates to a process as described above wherein M is zirconium. In other words, in a preferred embodiment, said metallocene comprises the transition metal zirconium.

In another preferred embodiment, the invention relates to a process as described above wherein the alumoxane is methylalumoxane.

In a further embodiment, a process is provided wherein the molar ratio of aluminum, provided by said alumoxane, to transition metal, provided by said metallocene, in said polymerization catalyst is between 10 and 1000, and preferably between 50 and 500.

The present process results in a bimodal product showing improved miscibility of the individual polyethylene components, and in turn bimodal polyethylene having improved mechanical and processing properties is provided. The Applicants have now found that by controlling the properties of the polymerisation catalyst, and in particular by using a polymerisation catalyst of a smaller size or diameter a bimodal polyethylene product have controlled particle size or diameter and improved features could be obtained, and in particular having improved homogenization characteristics. Moreover, products prepared with a bimodal polyethylene resin obtained when carrying out a process according to the present invention show less defects.

In accordance with the present process, by controlling the properties and the diameter of the polymerization catalyst, the diameter of the polymer particles in the produced polyethylene resin also is smaller, in particular smaller than 300 μm. This has been found to have the benefit of improved and easier homogenisation of the bimodal polymer during extrusion because the bimodal resin is able to be fully molten. The results obtained in accordance with the present invention are unexpected as prior art teachings suggest that a smaller polymer particle size would be disadvantageous since such polymer would be more difficult to flow through an extruder and thus more difficult to homogenise. It was also accepted that smaller resin particles would result in a lower settling efficiency.

The Applicants have shown that there is a correlation between the catalyst structure and polymer properties. The present process permits to prepare bimodal polyethylene having suitable properties, including a suitable particle diameter distribution and a suitable molecular weight distribution, in the presence of metallocene-based catalyst systems by adequate control of the catalyst structure, including its morphology and granulometry. The physical form of the final polymer product is in accordance with the present process controlled by the properties and structure of the catalyst. In addition, the present process also provides control over reactor operability and therefore represents an improvement over the existing art.

The invention further provides a process for preparing bimodal polyethylene, wherein polyethylene product granulometry has been improved, and therefore also provides a bimodal polyethylene product showing improved miscibility of the polyethylene fractions contained in the final bimodal product. The present invention thus permits to provide bimodal polyethylene product of controlled particle size or diameter, and of controlled molecular weight distribution.

In another aspect, the invention relates to a bimodal polyethylene product obtainable or obtained by carrying out the process according to the present invention.

With the insight to better show the characteristics of the invention, some preferred embodiments and examples are described hereafter.

DETAILED DESCRIPTION OF THE INVENTION

Before the present method and products of the invention are described, it is to be understood that this invention is not limited to particular methods, components, products or combinations described, as such methods, components, products and combinations may, of course, vary. It is also to be understood that the terminology used herein is not intended to be limiting, since the scope of the present invention will be limited only by the appended claims.

As used herein, the singular forms "a", "an", and "the" include both singular and plural referents unless the context clearly dictates otherwise.

The terms "comprising", "comprises" and "comprised of" as used herein are synonymous with "including", "includes" or "containing", "contains", and are inclusive or open-ended and do not exclude additional, non-recited members, elements or method steps. It will be appreciated that the terms "comprising", "comprises" and "comprised of" as used herein comprise the terms "consisting of", "consists" and "consists of".

The recitation of numerical ranges by endpoints includes all numbers and fractions subsumed within the respective ranges, as well as the recited endpoints.

All documents cited in the present specification are hereby incorporated by reference in their entirety.

Unless otherwise defined, all terms used in disclosing the invention, including technical and scientific terms, have the meaning as commonly understood by one of ordinary skill in the art to which this invention belongs. By means of further guidance, term definitions are included to better appreciate the teaching of the present invention.

The present invention will now be further described. In the following passages, different aspects of the invention are defined in more detail. Each aspect so defined may be combined with any other aspect or aspects unless clearly indicated to the contrary. In particular, any feature indicated as being preferred or advantageous may be combined with any other feature or features indicated as being preferred or advantageous.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to a person skilled in the art from this disclosure, in one or more embodiments. Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

The present invention relates to a process for the preparation of a particulate bimodal polyethylene product in a double loop reactor. A double loop reactor as applied in the present process comprises two serially connected loop reactors; i.e. a first and a second loop reactor that are connected to each other in series. The bimodal polyethylene product which is produced in this double loop reactor comprises at least two different polyethylene fractions that have been obtained by two subsequent polymerization processes. The two different polyethylene fractions have a different average and/or median molecular weight, whereby one of the fractions has a higher average and/or median molecular weight than the other fraction. The polymerization reaction is conducted substantially in the absence of catalyst poisons, such as moisture, with a catalytically effective amount of the catalyst at a suitable reaction temperature and pressure. The process comprises in particular the steps of:

(a) feeding ethylene monomer, a liquid hydrocarbon diluent, at least one polymerization catalyst, optionally hydrogen, and optionally one or more olefin co-monomers to a first loop reactor;

(b) polymerizing said ethylene and said optionally one or more olefin co-monomers in said first loop reactor to produce a first polyethylene product;

(c) transferring said first polyethylene product to a second loop reactor;

(d) feeding ethylene monomer, a diluent, optionally hydrogen, and optionally one or more olefin co-monomers to said second loop reactor;

(e) polymerizing said ethylene and said optionally one or more olefin co-monomers in said second loop reactor in the presence of said first polyethylene product to produce a bimodal polyethylene product;

(f) recovering from said second loop reactor said bimodal polyethylene product having a median particle diameter of less than 300 μm.

In step e) of the above process said ethylene and said optionally one or more olefin co-monomers are polymerised in said second loop reactor in the presence of said first polyethylene product and optionally in the presence of polymerisation catalyst that has been transferred together with said first polyethylene product to the second loop reactor; to produce a bimodal polyethylene product.

"Bimodal polyethylene" or "bimodal polyethylene product" as used herein refers to a bimodal polyethylene resin comprising two components having different properties, such as for instance two components of different molecular weight; two components of different densities; and/or two components having different productivities or reaction rates with respect to co-monomer. In an example one of said fractions has a higher molecular weight than said other fraction. In another example, one of said fractions has a higher density than said other fraction. However, the invention is not limited to the regulation of bimodal molecular weights or densities only, but may be used for bimodal regulation of other aspects of resin products, such as, but not limited to, co-monomer introduction, polydispersity, stereospecificity, etc.

The recovered product is a granular bimodal polyethylene product, also named particulate bimodal polyethylene product. The term "particulate" in the present context intends to refer to particles.

The above-defined bimodal polyethylene product can then be supplied to an extruder, optionally in combination with one or more additives, such as but not limited to antioxidants, anti-UV agents, anti-static agents, dispersive aid agents, processing aids, colorants, pigments, etc. The total content of these additives does generally not exceed 10 parts, preferably not 5 parts, by weight per 100 parts by weight of the final extruded product.

In a particular embodiment, "bimodal polyethylene" as used herein may refer to polyethylene comprising at least two fractions of ethylene polymer wherein one fraction has a lower molecular weight (LMW fraction) than the other fraction (HWM fraction. According to the invention, bimodal polyethylene is produced in a sequential step process, utilizing polymerization reactors coupled in series and using different conditions in each reactor, the different fractions produced in the different reactors will each have their own molecular weight. Hence, the resulting polyethylene product is a bimodal polyethylene product.

In a preferred embodiment, ethylene polymerization includes but is not limited to homopolymerization of ethylene, copolymerization of ethylene and a higher 1-olefin co-monomer such as 1-butene, 1-pentene, 1-hexene, 1-octene or 1-decene. In a particularly preferred embodiment of the present invention, said co-monomer is 1-hexene.

In accordance with the invention, ethylene polymerizes in a liquid diluent in the presence of a polymerisation catalyst as defined herein, optionally a co-monomer, optionally hydrogen and optionally other additives, thereby producing polymerization slurry comprising bimodal polyethylene.

As used herein, the term "polymerization slurry" or "polymer slurry" or "slurry" means substantially a multi-phase composition including at least polymer solids and a liquid phase, the liquid phase being the continuous phase. The solids include catalyst and a polymerized olefin, such as polyethylene. The liquids include an inert diluent, such as isobutane, dissolved monomer such as ethylene, co-monomer, molecular weight control agents, such as hydrogen, antistatic agents, antifouling agents, scavengers, and other process additives.

Suitable diluents are well known in the art and include but are not limited to hydrocarbon diluents such as aliphatic, cycloaliphatic and aromatic hydrocarbon solvents, or halogenated versions of such solvents. The preferred solvents are C12 or lower, straight chain or branched chain, saturated hydrocarbons, C5 to C9 saturated alicyclic or aromatic hydrocarbons or C2 to C6 halogenated hydrocarbons. Non-limiting illustrative examples of solvents are butane, isobutane, pentane, hexane, heptane, cyclopentane, cyclohexane, cycloheptane, methyl cyclopentane, methyl cyclohexane, isooctane, benzene, toluene, xylene, chloroform, chlorobenzenes, tetrachloroethylene, dichloroethane and trichloroethane. In a preferred embodiment of the present invention, said diluent is isobutane. However, it should be clear from the present invention that other diluents may as well be applied according to the present invention.

As used the person skilled in the art will appreciate that the nature, amounts and concentrations of the above given monomers, co-monomers, polymerisation catalyst and additional compounds for the polymerization as well as the polymerization time and reaction conditions in each reactor can vary depending on the desired bimodal polyethylene product.

The present process is in particular characterised in that it is carried out in the presence of a polymerization catalyst that comprises a particulate metallocene-alumoxane catalyst immobilized on a porous support or carrier. As used herein, the polymerization catalyst is a free-flowing and particulate catalyst structure in a form comprising dry particles. Methods for manufacturing of supported metallocene-alumoxane catalysts are known in the art and will therefore not be disclosed in detail herein.

In an embodiment, the invention provides a process for the preparation of a particulate bimodal polyethylene product in a serially connected double loop reactor, comprising the steps of:
(a) feeding ethylene monomer, a liquid hydrocarbon diluent, at least one polymerization catalyst, optionally hydrogen, and optionally one or more olefin co-monomers to a first loop reactor;
(b) polymerizing said ethylene and said optionally one or more olefin co-monomers in said first loop reactor to produce a first polyethylene product;
(c) transferring said first polyethylene product to a second loop reactor;
(d) feeding ethylene monomer, a diluent, optionally hydrogen, and optionally one or more olefin co-monomers to said second loop reactor;
(e) polymerizing said ethylene and said optionally one or more olefin co-monomers in said second loop reactor in the presence of said first polyethylene product to produce a bimodal polyethylene product;
(f) recovering from said second loop reactor said bimodal polyethylene product having a median particle diameter of less than 300 µm;
wherein said polymerization catalyst comprises a particulate metallocene-alumoxane catalyst immobilized on a porous support, and wherein said polymerization catalyst has a median particle diameter of less than 50 µm, and whereby the ratio of the median particle diameter of said bimodal polyethylene product to the median particle diameter of said polymerization catalyst is less than 30.

The support or carrier is an inert organic or inorganic solid, which is chemically unreactive with any of the components of the conventional metallocene catalyst. Suitable support materials for the supported catalyst of the present invention include solid inorganic oxides, such as silica, alumina, magnesium oxide, titanium oxide, thorium oxide, as well as mixed oxides of silica and one or more Group 2 or 13 metal oxides, such as silica-magnesia and silica-alumina mixed oxides. Silica, alumina, and mixed oxides of silica and one or more Group 2 or 13 metal oxides are preferred support materials. Preferred examples of such mixed oxides are the silica-aluminas. Most preferred is silica. The silica may be in granular, agglomerated, fumed or other form.

Prior to its use, if desired, the support material may be subjected to a heat treatment and/or chemical treatment to reduce the water content or the hydroxyl content of the support material. Typical thermal pretreatments are carried out at a temperature from 30 to 1000° C. for a duration of 10 minutes to 50 hours in an inert atmosphere or under reduced pressure.

In a preferred embodiment, a polymerization catalyst applied in the present polymerisation process is a supported metallocene-alumoxane catalyst consisting of a metallocene and an alumoxane which are bound on a porous silica support.

More in particular, in accordance with the present invention, the present process is carried out in the presence of particulate supported metallocene-alumoxane catalyst, wherein said polymerisation catalyst has a median particle diameter (d50) of less than 50 μm. The "median particle diameter" and "d50" of a catalyst as used herein essentially refer to a same parameter and refer to the particle diameter of the catalyst for which fifty percent of the particles has a diameter lower than the d50. The catalyst's d50 is generally measured by laser diffraction analysis on a Malvern type analyserafter having put the catalyst in suspension in a solvent such as e.g. cyclohexane.

In a preferred embodiment the terms "median particle diameter" or "d50" of a polymer product as used herein essentially refer to a same parameter, which is defined as the polymer particle diameter for which fifty percent of the particles has a diameter lower than the d50. The polymer product's d50 is generally measured according to ASTM method D 1921-89.

The present invention provides a process for preparing a bimodal polyethylene product having improved granulometry and morphology. According to an embodiment of the invention a process is provided for preparing a particulate bimodal polyethylene product with a median particle diameter of maximum 300 μm. In another embodiment, the invention provides a process for preparing a particulate bimodal polyethylene product having a median particle diameter which is less than 300 μm, less than 250 μm, less than 200 μm, less than 180 μm, less than 160 μm or less than 150 μm.

In another embodiment, the invention provides a process for preparing a particulate bimodal polyethylene product as described above wherein the polymerization catalyst applied in said process has a median particle diameter of between 10 and 50 μm. In another embodiment, the invention provides a process for preparing a particulate bimodal polyethylene product wherein the polymerization catalyst applied in said process has a median particle diameter of less than 50 μm, less than 45 μm, less than 40 μm, less than 35 μm, less than 30 μm, less than 25 μm, less than 20 μm, or less than 15 μm.

The present polymerization process is further characterised in that the ratio of the median particle diameter of said bimodal polyethylene product prepared in the process to the median particle diameter of said polymerization catalyst applied in the process is less than 30, and for instance comprised between 2 and 15.

In other embodiments, the support of a polymerization catalyst as defined herein has one or more of the following properties.

In an embodiment, the invention provides a process wherein the support of the polymerization catalyst is a porous support, and preferably a porous silica support having a surface area comprised between 200 and 700 m²/g, and preferably between 250 and 350 m²/g.

In another embodiment, the invention provides a process wherein the support of the polymerization catalyst is a porous support, and preferably a porous silica support having an average pore volume comprised between 0.5 and 3 ml/g, and preferably between 1 and 2 ml/g.

In yet another embodiment, the invention provides a process wherein the support of the polymerization catalyst is a porous support, and preferably a porous silica support having an average pore diameter comprised between 50 and 300 Angstrom, and preferably between 75 and 220 Angstrom.

Reference will now be made to the catalyst applied in the process according to the invention. The term "catalyst" as used herein, is defined as a substance that causes a change in the rate of a chemical reaction without itself being consumed in the reaction. The term "polymerisation catalyst" and "catalyst" may be considered herein as synonyms. The catalysts used in the invention are metallocene-based catalysts.

As used herein, the term "metallocene" refers to a transition metal complex with a coordinated structure, consisting of a metal atom bonded to one or more ligands. The metallocenes which are used according to the invention are represented by formula (I) or (II):

$(Ar)_2MQ_2$         (I); or

$R''(Ar)_2MQ_2$         (II)

wherein the metallocenes according to formula (I) are non-bridged metallocenes and the metallocenes according to formula (II) are bridged metallocenes;

wherein said metallocene according to formula (I) or (II) has two Ar bound to M which can be the same or different from each other;

wherein Ar is an aromatic ring, group or moiety and wherein each Ar is independently selected from the group consisting of cyclopentadienyl, indenyl, tetrahydroindenyl or fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P;

wherein M is a transition metal selected from the group consisting of titanium, zirconium, hafnium and vanadium; and preferably is zirconium;

wherein each Q is independently selected from the group consisting of halogen; a hydrocarboxy having 1 to 20 carbon atoms; and a hydrocarbyl having 1 to 20 carbon atoms and wherein said hydrocarbyl optionally contains one or more atoms selected from the group comprising B, Si, S, O, F, Cl and P; and wherein R" is a divalent group or moiety bridging the two Ar groups and selected from the group consisting of a $C_1$-$C_{20}$ alkylene, a germanium, a silicon, a siloxane, an alkylphosphine and an amine, and wherein said R" is optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms and wherein said hydrocarbyl optionally contains one or more atoms selected from the group comprising B, Si, S, O, F, Cl and P.

The term "hydrocarbyl having 1 to 20 carbon atoms" as used herein is intended to refer to a moiety selected from the group comprising a linear or branched $C_1$-$C_{20}$ alkyl; $C_3$-$C_{20}$ cycloalkyl; $C_6$-$C_{20}$ aryl; $C_7$-$C_{20}$ alkylaryl and $C_7$-$C_{20}$ arylalkyl, or any combinations thereof. Exemplary hydrocarbyl groups are methyl, ethyl, propyl, butyl, amyl, isoamyl, hexyl, isobutyl, heptyl, octyl, nonyl, decyl, cetyl, 2-ethylhexyl, and phenyl.

Exemplary halogen atoms include chlorine, bromine, fluorine and iodine and of these halogen atoms, fluorine and chlorine are preferred.

In accordance with the present invention, a process is provided wherein ethylene monomer is polymerised in the presence of a bridged or non-bridged metallocene. "Bridged metallocenes" as used herein, are metallocenes in which the two aromatic transition metal ligands, denoted as Ar in formula (I) and (II) (i.e. the two cyclopentadienyl, indenyl, tetrahydroindenyl or fluorenyl groups) are covalently linked or connected by means of a structural bridge. Such structural bridge, denoted as R" in formula (I) and (II) imparts stereorigidity on the metallocene, i.e. the free movement of the metal ligands is restricted. According to the invention, the bridged metallocene consists of a meso or racemic stereoisomer.

In a preferred embodiment, the metallocenes which are used in a process according to the invention are represented by formula (I) or (II) as given above,
wherein Ar is as defined above, and wherein both Ar are the same and are selected from the group consisting of cyclopentadienyl, indenyl, tetrahydroindenyl and fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms as defined herein, and a hydrocarbyl having 1 to 20 carbon atoms as defined herein;
wherein M is as defined above, and preferably is zirconium,
wherein Q is as defined above, and preferably both Q are the same and are selected from the group consisting of chloride, fluoride and methyl, and preferably are chloride; and
and wherein R" when present, is as defined above and preferably is selected from the group consisting of a $C_1$-$C_{20}$ alkylene, and a silicon, and wherein said R" is optionally substituted with one or more substituents each independently selected from the group consisting of a halogen, a hydrosilyl, a $SiR_3$ group wherein R is a hydrocarbyl having 1 to 20 carbon atoms as defined herein, and a hydrocarbyl having 1 to 20 carbon atoms as defined herein.

In another preferred embodiment, the metallocenes which are used in a process according to the invention are represented by formula (I) or (II) as given above,
wherein Ar is as defined above, and wherein both Ar are different and are selected from the group consisting of cyclopentadienyl, indenyl, tetrahydroindenyl and fluorenyl, wherein each of said groups may be optionally substituted with one or more substituents each independently selected from the group consisting of halogen, a hydrosilyl, a $SiR_3$ group wherein R is a hydrocarbyl having 1 to 20 carbon atoms as defined herein, and a hydrocarbyl having 1 to 20 carbon atoms as defined herein;
wherein M is as defined above, and preferably is zirconium,
wherein Q is as defined above, and preferably both Q are the same and are selected from the group consisting of chloride, fluoride and methyl, and preferably are chloride; and
and wherein R" when present is as defined above and preferably is selected from the group consisting of a $C_1$-$C_{20}$ alkylene, and a silicon, and wherein said R" is optionally substituted with one or more substituents each independently selected from the group consisting of a halogen, a hydrosilyl, a $SiR_3$ group wherein R is a hydrocarbyl having 1 to 20 carbon atoms as defined herein, and a hydrocarbyl having 1 to 20 carbon atoms as defined herein.

In an embodiment, the invention provides a process wherein said metallocene is an unbridged metallocene.

In a preferred embodiment the invention provides a process wherein said metallocene is an unbridged metallocene of formula (I)

$$(Ar)_2MQ_2 \qquad (I)$$

wherein said two Ar that are bound to M are the same and are selected from the group consisting of cyclopentadienyl, indenyl, and tetrahydroindenyl, wherein each of said groups may be optionally substituted with one or more substituents each independently selected from the group consisting of halogen and a hydrocarbyl having 1 to 20 carbon atoms as defined herein;
wherein M is a transition metal selected from the group consisting of titanium, zirconium, hafnium and vanadium; and preferably is zirconium; and
wherein both Q are the same and are selected from the group consisting of chloride, fluoride and methyl, and preferably are chloride.

In a preferred embodiment, the invention provides a process wherein said metallocene is an unbridged metallocene selected from the group comprising bis(iso-butylcyclopentadienyl)zirconium dichloride, bis(pentamethylcyclopentadienyl)zirconium dichloride, bis(tetrahydroindenyl)zirconium dichloride, bis(indenyl)zirconium dichloride, bis(1,3-dimethylcyclopentadienyl)zirconium dichloride, bis(methylcyclopentadienyl)zirconium dichloride, bis(n-butylcyclopentadienyl)zirconium dichloride, and bis(cyclopentadienyl)zirconium dichloride; and preferably selected from the group comprising bis(cyclopentadienyl)zirconium dichloride, bis(tetrahydroindenyl)zirconium dichloride, bis(indenyl)zirconium dichloride, and bis(n-butyl-cyclopentadienyl)zirconium dichloride.

In another embodiment, the invention provides a process wherein said metallocene is a bridged metallocene.

In a preferred embodiment the invention provides a process wherein said metallocene is an bridged metallocene of formula (II)

$$R"(Ar)_2MQ_2 \qquad (II)$$

wherein said two Ar that are bound to M are the same and are selected from the group consisting of cyclopentadienyl, indenyl, and tetrahydroindenyl, wherein each of said groups may be optionally substituted with one or more substituents each independently selected from the group consisting of halogen and a hydrocarbyl having 1 to 20 carbon atoms as defined herein;
wherein M is a transition metal selected from the group consisting of titanium, zirconium, hafnium and vanadium; and preferably is zirconium;
wherein both Q are the same and are selected from the group consisting of chloride, fluoride and methyl, and preferably are chloride, and
wherein R" is selected from the group consisting of a $C_1$-$C_{20}$ alkylene, and a silicon, and wherein said R" is optionally substituted with one or more substituents each independently selected from the group consisting of a halogen, and a hydrocarbyl having 1 to 20 carbon atoms as defined herein.

In a preferred embodiment, the invention provides a process wherein said metallocene is a bridged metallocene selected from the group comprising ethylenebis(4,5,6,7-tetrahydro-1-indenyl)zirconium dichloride, ethylenebis(1-indenyl)zirconium dichloride, dimethylsilylene bis(2-methyl-4-phenyl-inden-1-yl)zirconium dichloride, dimethylsilylene bis(2-methyl-1H-cyclopenta[a]naphthalen-3-yl)zirconium dichloride, cyclohexylmethylsilylene bis[4-(4-tert-butylphenyl)-2-methyl-inden-1-yl]zirconium dichloride, dimethylsilylene bis[4-(4-tert-butylphenyl)-2-(cyclohexylmethyl)inden-1-yl]zirconium dichloride.

In another preferred embodiment the invention provides a process wherein said metallocene is an bridged metallocene of formula (II)

$$R"(Ar)_2MQ_2 \qquad (II)$$

wherein said two Ar that are bound to M are different and are selected from the group consisting of cyclopentadienyl and fluorenyl, wherein each of said groups may be optionally substituted with one or more substituents each independently selected from the group consisting of halogen and a hydrocarbyl having 1 to 20 carbon atoms as defined herein;
wherein M is a transition metal selected from the group consisting of titanium, zirconium, hafnium and vanadium; and preferably is zirconium;
wherein both Q are the same and are selected from the group consisting of chloride, fluoride and methyl, and preferably are chloride, and
wherein R″ is selected from the group consisting of a $C_1$-$C_{20}$ alkylene, and a silicon, and wherein said R″ is optionally substituted with one or more substituents each independently selected from the group consisting of a halogen, and a hydrocarbyl having 1 to 20 carbon atoms as defined herein.

In another preferred embodiment, the invention provides a process wherein said metallocene is a bridged metallocene selected from the group comprising diphenylmethylene (3-t-butyl-5-methyl-cyclopentadienyl) (4,6-di-t-butyl-fluorenyl) zirconium dichloride, di-p-chlorophenylmethylene (3-t-butyl-5-methyl-cyclopentadienyl) (4,6-di-t-butyl-fluorenyl) zirconium dichloride, diphenylmethylene (cyclopentadienyl)(fluoren-9-yl)zirconium dichloride, dimethylmethylene (cyclopentadienyl)(2,7-ditert-butyl-fluoren-9-yl)zirconium dichloride, dimethylmethylene[1-(4-tert-butyl-2-methyl-cyclopentadienyl)](fluoren-9-yl)zirconium dichloride, diphenylmethylene[1-(4-tert-butyl-2-methyl-cyclopentadienyl)] (2,7-ditert-butyl-fluoren-9-yl)zirconium dichloride, dimethylmethylene[1-(4-tert-butyl-2-methyl-cyclopentadienyl)](3,6-ditert-butyl-fluoren-9-yl)zirconium dichloride and dimethylmethylene (cyclopentadienyl)(fluoren-9-yl)zirconium dichloride.

Metallocene compounds used in accordance with the present invention are immobilised on a support in the presence of an activating agent. In a preferred embodiment, alumoxane is used as an activating agent for the metallocene. The alumoxane can be used in conjunction with a catalyst in order to improve the activity of the catalyst during the polymerization reaction. As used herein, the term alumoxane is used interchangeably with aluminoxane and refers to a substance, which is capable of activating the metallocene.

Alumoxanes used in accordance with the present invention comprise oligomeric linear and/or cyclic alkyl alumoxanes. In an embodiment, the invention provides a process wherein said alumoxane has formula (III) or (IV)

R—(Al(R)—O)$_x$—AlR$_2$     (III) for oligomeric, linear alumoxanes; or (—Al(R)—O—)$_y$     (IV) for oligomeric, cyclic alumoxanes wherein x is 1-40, and preferably 10-20;
wherein y is 3-40, and preferably 3-20; and
wherein each R is independently selected from a $C_1$-$C_8$ alkyl, and preferably is methyl. In a preferred embodiment, the alumoxane is methylalumoxane. Generally, in the preparation of alumoxanes from, for example, aluminum trimethyl and water, a mixture of linear and cyclic compounds is obtained. Methods for manufacturing alumoxane are known in the art and will therefore not be disclosed in detail herein.

In a particular embodiment, the invention provides a process wherein the molar ratio of aluminum, provided by the alumoxane, to transition metal, provided by the metallocene, of the polymerization catalyst is between 10 and 1000, and for instance between 50 and 500, or between 100 and 150.

The invention further relates to bimodal polyethylene products that are obtainable or obtained by carrying out a process according to the invention.

As mentioned above, the present invention provides a bimodal polyethylene product having improved granulometry and morphology, and in particular, having a median particle diameter of less than 300 μm, less than 250 μm, less than 200 μm, less than 180 μm, less than 160 μm or less than 150 μm.

A polyethylene product which is produced according to the invention is a bimodal polyethylene product having a bimodal molecular weight distribution (MWD) and thus comprising two different polyethylene fractions.

As used herein, the "molecular weight distribution" (MWD), also referred to as polydispersity (characterized by the polydispersity index), is defined as the ratio of weight average molar mass (Mw) divided by number average molar mass (Mn). MWD gives an indication of the uniformity of the degree of polymerization and thus the length and weight of the polymer chains.

In an embodiment, a bimodal polyethylene product prepared in accordance with the present invention is characterized by two polyethylene fractions having a different molecular weight, whereby each of the fractions is characterized by a polydispersity index of maximum 5, and for instance of maximum 4, 3, or 2, and wherein said bimodal polyethylene product has a polydispersity index which is greater than the largest polydispersity index of said polyethylene fractions, and for instance greater that 3, 5, or 7.

In another embodiment, a bimodal polyethylene product prepared in accordance with the present invention is characterized by two polyethylene fractions having a different molecular weight, whereby in an embodiment the higher molecular weight fraction has a high load melt index (HMLI) comprised between 0.01 g/10 minutes and 10 g/10 minutes. In another embodiment, a bimodal polyethylene product prepared in accordance with the present invention has a high load melt index higher (HMLI) than 3 g/10 minutes. The high load melt index (HLMI) or high load melt flow rate can be measured according to the ASTM-D1238 standard.

EXAMPLE

The present example illustrates an embodiment of a polymerization catalyst that can be used in a polymerization process according to the invention. The polymerization catalyst consists of a metallocene-alumoxane catalyst immobilized on a particulate porous silica support. The metallocene consists in particular of ethylenebis(4,5,6,7-tetrahydro-1-indenyl) zirconium dichloride and alumoxane is methylalumoxane (MAO). Features for the polymerization catalyst are listed in Table 1. The illustrated polymerisation catalyst can be used to prepare a particulate bimodal polyethylene resin having a median particle diameter of lower than 300 μm in a double loop reactor.

TABLE 1

| | |
|---|---|
| Catalyst median particle diameter (μm) | 40 μm |
| surface area (m$^2$/g) of silica support | 350 |
| Average pore volume (ml/g) | 1.6 |
| Average pore diameter (Angstrom) | 100 |
| Al/Zr ratio | 130 |

The invention claimed is:
1. Process for the preparation of a particulate bimodal polyethylene product in a serially connected double loop reactor, comprising the steps of:

(a) feeding ethylene monomer, a liquid hydrocarbon diluent, at least one polymerization catalyst, optionally hydrogen, and optionally one or more olefin co-monomers to a first loop reactor;
(b) polymerizing said ethylene and said optionally one or more olefin co-monomers in said first loop reactor to produce a first polyethylene product;
(c) transferring said first polyethylene product to a second loop reactor;
(d) feeding ethylene monomer, a diluent, optionally hydrogen, and optionally one or more olefin co-monomers to said second loop reactor;
(e) polymerizing said ethylene and said optionally one or more olefin co-monomers in said second loop reactor in the presence of said first polyethylene product to produce a bimodal polyethylene product;
(f) recovering from said second loop reactor said bimodal polyethylene product having a median particle diameter of less than 300 μm;
wherein said polymerization catalyst comprises a particulate metallocene-alumoxane catalyst immobilized on a porous silica support, and wherein said polymerization catalyst has a median particle diameter of less than 50 μm, and
whereby the ratio of the median particle diameter of said bimodal polyethylene product to the median particle diameter of said polymerization catalyst is less than 30.

2. Process according to claim 1, wherein said median particle diameter of said polymerization catalyst is less than 35 μm.

3. Process according to claim 1, wherein said bimodal polyethylene product comprises at least two different polyethylene fractions, whereby one of said fractions has a higher molecular weight than said other fraction, wherein each of said polyethylene fractions has a polydispersity index of maximum 5, and wherein said bimodal polyethylene product has a polydispersity index which is greater than the largest polydispersity index of said polyethylene fractions.

4. Process according to claim 3, wherein the polyethylene fraction having said higher molecular weight has a high load melt index (HLMI; ASTM-D1238, 190° C., 21.6 kg) comprised between 0.01 g/10 min and 10 g/10 min and wherein said bimodal polyethylene product has a HLMI higher than 3 g/10 min.

5. Process according to claim 1, wherein said metallocene has formula (I) or (II)

  (I) for non-bridged metallocenes; or

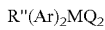  (II) for bridged metallocenes wherein each Ar is independently selected from the group consisting of cyclopentadienyl, indenyl, tetrahydroindenyl, and fluorenyl; and wherein Ar is optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl, and P;
wherein M is a transition metal selected from the group consisting of titanium, zirconium, hafnium and vanadium;
wherein each Q is independently selected from the group consisting of halogen; a hydrocarboxy having 1 to 20 carbon atoms; and a hydrocarbyl having 1 to 20 carbon atoms wherein said hydrocarbyl optionally contains one or more atoms selected from the group comprising B, Si, S, O, F, Cl and P;
wherein R" is a bridge between the two Ar and selected from the group consisting of a $C_1$-$C_{20}$ alkylene, a germanium, a silicon, a siloxane, an alkylphosphine and an amine, wherein said R" is optionally substituted with one or more substituents each independently selected from the group consisting of halogen, a hydrosilyl, a $SiR_3$ group wherein R is a hydrocarbyl having 1 to 20 carbon atoms, and a hydrocarbyl having 1 to 20 carbon atoms, and wherein said hydrocarbyl optionally contains one or more atoms selected from the group comprising B, Si, S, O, F, Cl and P.

6. Process according to claim 1, wherein said alumoxane has formula (III) or (IV)

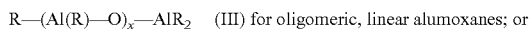  (III) for oligomeric, linear alumoxanes; or

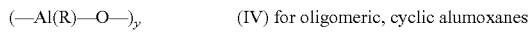  (IV) for oligomeric, cyclic alumoxanes wherein x is 1-40, y is 3-40, and each R is independently selected from a $C_1$-$C_8$ alkyl.

7. Process according to claim 1, wherein said metallocene is an unbridged metallocene selected from the group consisting of bis(iso-butylcyclopentadienyl)zirconium dichloride, bis(pentamethylcyclopentadienyl)zirconium dichloride, bis(tetrahydroindenyl)zirconium dichloride, bis(indenyl)zirconium dichloride, bis(1,3-dimethylcyclopentadienyl)zirconium dichloride, bis(methylcyclopentadienyl)zirconium dichloride, bis(n-butylcyclopentadienyl)zirconium dichloride, and bis(cyclopentadienyl)zirconium dichloride.

8. Process according to claim 1, wherein said metallocene is a bridged metallocene selected from the group consisting of ethylenebis(4,5,6,7-tetrahydro-1-indenyl)zirconium dichloride, ethylenebis(1-indenyl)zirconium dichloride, dimethylsilylene bis(2-methyl-4-phenyl-inden-1-yl)zirconium dichloride, dimethylsilylene bis(2-methyl-1H-cyclopenta[a]naphthalen-3-yl)zirconium dichloride, cyclohexylmethylsilylene bis[4-(4-tert-butylphenyl)-2-methyl-inden-1-yl]zirconium dichloride, and dimethylsilylene bis[4-(4-tert-butylphenyl)-2-(cyclohexylmethyl)inden-1-yl]zirconium dichloride.

9. Process according to claim 1, wherein said metallocene is a bridged metallocene selected from the group consisting of diphenylmethylene (3-t-butyl-5-methyl-cyclopentadienyl)(4,6-di-t-butyl-fluorenyl)zirconium dichloride, di-p-chlorophenylmethylene (3-t-butyl-5-methyl-cyclopentadienyl)(4,6-di-t-butyl-fluorenyl)zirconium dichloride, diphenylmethylene (cyclopentadienyl)(fluoren-9-yl)zirconium dichloride, diphenylmethylene (cyclopentadienyl)(fluoren-9-yl)zirconium dichloride, dimethylmethylene (cyclopentadienyl)(2,7-ditert-butyl-fluoren-9-yl)zirconium dichloride, dimethylmethylene[1-(4-tert-butyl-2-methyl-cyclopentadienyl)](fluoren-9-yl)zirconium dichloride, diphenylmethylene[1-(4-tert-butyl-2-methyl-cyclopentadienyl)](2,7-ditert-butyl-fluoren-9-yl)zirconium dichloride, dimethylmethylene[1(4-tert-butyl-2-methyl-cyclopentadienyl)](3,6-ditert-butyl-fluoren-9-yl)zirconium dichloride, and dimethylmethylene (cyclopentadienyl)(fluoren-9-yl)zirconium dichloride.

10. Process according to claim 1, wherein said median particle diameter of said bimodal polyethylene product is less than 250 μm.

11. Process according to claim 1, wherein said porous silica support has a surface area between 200 and 700 m²/g.

12. Process according to claim 1, wherein said porous silica support has a pore volume between 0.5 and 3 ml/g.

13. Process according to claim 1, wherein said porous silica support has an average pore diameter between 50 and 300 Angstrom.

14. Process according to claim 1, wherein the molar ratio of aluminum, provided by said alumoxane, to transition metal, provided by said metallocene, in said polymerization catalyst is between 10 and 1000.

* * * * *